United States Patent
Rullan et al.

(10) Patent No.: US 10,635,286 B2
(45) Date of Patent: Apr. 28, 2020

(54) VISUALIZATIONS SUPPORTING UNLIMITED ROWS AND COLUMNS

(71) Applicant: Oracle International Corporation, Redwood Shores, CA (US)

(72) Inventors: Christopher Rullan, Cambridge, MA (US); Hendrik van den Broek, Lexington, MA (US); Chadwick Chow, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/478,966

(22) Filed: Apr. 4, 2017

(65) Prior Publication Data

US 2018/0113604 A1 Apr. 26, 2018

Related U.S. Application Data

(60) Provisional application No. 62/411,642, filed on Oct. 23, 2016.

(51) Int. Cl.
| | | |
|---|---|---|
| *G06F 17/00* | (2019.01) | |
| *G06F 3/0485* | (2013.01) | |
| *G06F 17/24* | (2006.01) | |
| *G06T 11/20* | (2006.01) | |
| *G06F 17/22* | (2006.01) | |

(52) U.S. Cl.
CPC ...... *G06F 3/04855* (2013.01); *G06F 17/2247* (2013.01); *G06F 17/246* (2013.01); *G06T 11/206* (2013.01)

(58) Field of Classification Search
CPC ............. G06F 3/04855; G06F 17/2247; G06F 17/246; G06T 11/206
USPC .................................. 715/273, 786, 212, 215
See application file for complete search history.

(56) References Cited

U.S. PATENT DOCUMENTS

| | | | | |
|---|---|---|---|---|
| 6,222,541 B1 * | 4/2001 | Bates | ................ | G06F 3/0481 715/786 |
| 8,205,168 B1 * | 6/2012 | Van Slembrouck | ................ | G06F 3/0483 715/784 |
| 8,689,095 B2 * | 4/2014 | Parish | ................ | G06F 17/246 709/203 |

(Continued)

OTHER PUBLICATIONS

Chintapalli et al., A Comparative Study of Spreadsheet Applications on Mobile Devices, Google Scholar 2016, pp. 1-11.*

(Continued)

*Primary Examiner* — Cong-Lac Huynh
(74) *Attorney, Agent, or Firm* — Trellis IP Law Group, PC

(57) ABSTRACT

A visualization displays a portion of a big data set in a control in a browser-based GUI. The browser may support HTML and the control may include a DOM element. The control includes a canvas for rendering the big data portion. To create the visualization, the smaller of the browser's maximum canvas size and the big data set's candidate canvas size is determined. The canvas is sized accordingly. A page in the canvas is filled with initial data and the visualization is displayed with a scrollbar. Upon receiving a user input, it is determined if the user input denotes a short or long scroll. It is also determined if the scroll reaches an end of the scrollbar. Data is fetched from a relative location in the big data set in proportion with the relative scroll position, and respecting the data set and canvas limits.

12 Claims, 3 Drawing Sheets

(56) References Cited

U.S. PATENT DOCUMENTS

| | | | | |
|---|---|---|---|---|
| 9,720,898 B2* | 8/2017 | Lloyd | | G06F 17/246 |
| 9,760,271 B2* | 9/2017 | Persaud | | G06F 3/0485 |
| 2001/0045952 A1* | 11/2001 | Tenev | | G06T 11/206 |
| | | | | 345/440 |
| 2002/0063737 A1* | 5/2002 | Feig | | G06F 3/04847 |
| | | | | 715/786 |
| 2002/0122066 A1* | 9/2002 | Bates | | G06F 3/04855 |
| | | | | 715/786 |
| 2006/0095833 A1* | 5/2006 | Orchard | | G06F 17/246 |
| | | | | 715/209 |
| 2007/0143705 A1* | 6/2007 | Peters | | G06F 3/04855 |
| | | | | 715/786 |
| 2008/0222530 A1* | 9/2008 | Lakshmanan | | G06F 3/04892 |
| | | | | 715/735 |
| 2009/0070707 A1* | 3/2009 | Schaller | | G06F 3/04855 |
| | | | | 715/787 |
| 2009/0150822 A1* | 6/2009 | Miller | | G06F 3/0485 |
| | | | | 715/784 |
| 2010/0079462 A1* | 4/2010 | Breeds | | G06T 11/206 |
| | | | | 345/440 |
| 2010/0131886 A1* | 5/2010 | Gannon | | G06F 3/0485 |
| | | | | 715/786 |
| 2010/0205520 A1* | 8/2010 | Parish | | G06F 17/246 |
| | | | | 715/212 |
| 2011/0252299 A1* | 10/2011 | Lloyd | | G06F 17/246 |
| | | | | 715/212 |
| 2011/0252300 A1* | 10/2011 | Lloyd | | G06F 17/246 |
| | | | | 715/217 |
| 2011/0252339 A1* | 10/2011 | Lemonik | | G06F 17/2288 |
| | | | | 715/753 |
| 2011/0258577 A1* | 10/2011 | Steelberg | | G06F 3/04855 |
| | | | | 715/786 |
| 2011/0307772 A1* | 12/2011 | Lloyd | | G06F 17/246 |
| | | | | 715/212 |
| 2012/0117452 A1* | 5/2012 | Lloyd | | G06F 17/246 |
| | | | | 715/212 |
| 2013/0169644 A1* | 7/2013 | Bolton | | H04Q 9/00 |
| | | | | 345/440 |
| 2013/0332811 A1* | 12/2013 | Chang | | G06F 17/246 |
| | | | | 715/217 |
| 2015/0169531 A1* | 6/2015 | Campbell | | G06F 17/246 |
| | | | | 715/212 |
| 2016/0103799 A1* | 4/2016 | Wu | | G06F 17/30861 |
| | | | | 715/251 |
| 2016/0335330 A1* | 11/2016 | Teodorescu | | G06F 16/9024 |
| 2017/0329862 A1* | 11/2017 | Parker | | G06F 17/30899 |

OTHER PUBLICATIONS

Sarkar et al., Stretching the Rubber Sheet: A Metaphor for Viewing Large Layout on Small Screens, ACM 1993, pp. 81-91. (Year: 1993).*

Lin et al., MRDP: Multiple-Row Detailed Placement of Heterogeneous-Sized Cells for Advances Nodes, IEEE 2018, pp. 1237-1250. (Year: 2018).*

Lamberti et al., VDHM: Viewport-DOM based Heat Maps as a Tool for Visually Aggregating Web User's Interaction Data from Mobile and Heterogenous Devices, IEEE 2015, pp. 33-40. (Year: 2015).*

Kleiman et al., DynannicMaps: Similarity-based Browsing through a Massive Set of Images, ACM 2015, pp. 995-1004. (Year: 2015).*

* cited by examiner

VISUALIZATIONS SUPPORTING UNLIMITED ROWS AND COLUMNS

CROSS REFERENCES TO RELATED APPLICATIONS

This application claims priority from U.S. provisional patent application Ser. No. 62/411,642, entitled Visualizations Supporting Unlimited Rows and Columns, filed on Oct. 23, 2016, which is hereby incorporated by reference as if set forth in full in this application for all purposes.

BACKGROUND

The present invention is in the area of visualizations in computer graphical user interfaces (GUIs), including those using hypertext markup language (HTML). It can be used in applications that visualize huge amounts of data on a computer's display, while providing a user the ability to scroll in the data to impact a displayed portion of the data. The data can be arranged in one or more dimensions.

Visualizations are software components (software components are also called controls or widgets) used in GUIs to display data, emphasizing some aspects of the data and de-emphasizing other aspects. Visualizations allow data presentation in a perspective that is meaningful for the users, whether these are presenters of the data, or consumers. In the case of "big data", a user may have a need to zoom in on a small portion of the data. Data may be presented in a data grid (spreadsheets, lists, tables) along row, column, page, and possibly further coordinates, or in an image along x and y pixel coordinates, in a Gantt chart or other chart, in a graph, or in any other visualization format known in the art.

Visualizations may be pre-compiled as software components in a particular software development environment, or they may be generated on-the-fly, such as in a web page or other HTML-related document, potentially using an interpreted language such as JavaScript.

When creating a visualization for big data, developers may run into limitations presented by a target GUI. For example, it is not practical to show a full spreadsheet of a million rows and a million columns on a computer display. Such as spreadsheet would have one trillion cells, but a contemporary 8K display has only 7,680×4,320=33,177,600 pixels. The problem gets much worse for a spreadsheet that would have, for example, each a trillion rows and columns.

Visualizations in a web browser or multi-platform app—often implemented in HTML and JavaScript—run into various limitations from the browser itself, or the utilized browser control, for example related to the maximum canvas size of a display element, the maximum size of an internally used integer, or the maximum memory available. Further limitations are presented by the scrolling capabilities of HTML Document Object Model (DOM) elements.

To address this problem, developers have relied on virtual browsing, or virtualizing canvases, to display data subsets. Some developers display part of a data series, and fetch more data when a user scrolls towards its end. However, these approaches have not provided their users great scrolling capabilities or shielded them sufficiently from the aforementioned browser limitation issues.

SUMMARY

Visualizations are software components used in computer graphical user interfaces (GUIs) to display data, emphasizing some aspects of the data and de-emphasizing other aspects. Visualizations allow data presentation in a perspective that is meaningful for users. In the case of "big data" (extremely large or complex data sets), a user may have a need to zoom in on and interact with small portions of the data. Data may be presented in a data grid (spreadsheets, lists, tables) along row, column, and possibly further coordinates.

When creating a visualization for big data, developers may run into limitations presented by a target GUI. If the target GUI is or includes one or more commercially available HTML browsers, various browser limitations may make it difficult to present the large dataset. The visualization—often implemented in HTML and JavaScript—runs into limitations that may even be different among different available browsers.

A big data set may have any number of data elements, for example a septillion. Browser support canvas sizes that typically contain even many orders of magnitude fewer pixels. Therefore, embodiments of the invention dynamically load and display a small subset of the data in a visualization.

In a first aspect, an embodiment of the invention provides a method for displaying a portion of a big data set in a browser, which may be HTML-based. The method comprises: creating a visualization including a control (which may include an HTML document object model (DOM) element) in the browser, wherein the control includes a canvas; determining a candidate canvas size based on a size of the big data set; determining a maximum canvas size supported by the browser; sizing the canvas based on the smaller of the candidate canvas size and the maximum canvas size; filling a preload region or at least a page in the canvas with an initial block of data from the big data set; displaying the visualization on the computer screen, and displaying a scrollbar in the visualization; receiving a user scroll input, wherein the user scroll input may denote a long scroll or a short scroll; determining if the user scroll input denotes either a long scroll or a short scroll; upon determining that the user scroll input denotes a long scroll, calculating a scroll proportion from a scrollbar slider position; upon calculating the scroll proportion, determining if the scroll proportion equals 100%; upon determining that the scroll proportion equals 100%, filling a last page in the canvas with a last block of data from the big data set; upon determining that the scroll proportion is less than 100%, filling a page in the canvas with a data block from a big data set location calculated from a size of the big data set times the scroll proportion; upon determining that the user scroll input denotes a short scroll, filling a page in the canvas with a next block of data from the big data set; and discarding canvas page data that is no longer in the canvas preload region.

In a second aspect, an embodiment of the invention provides a tangible, non-transitory computer-readable information storage medium with instructions comprising the method from the first aspect above.

In a third aspect, an embodiment of the invention provides a system with an application server and a client computer, wherein the application server communicates data from a database to the client computer, and the client computer includes a software program providing computer instructions executable by the client computer that include the method from the first aspect above.

BRIEF DESCRIPTION OF THE DRAWINGS

The invention will be described with reference to the drawings, in which.

DETAILED DESCRIPTION

Figure 1:
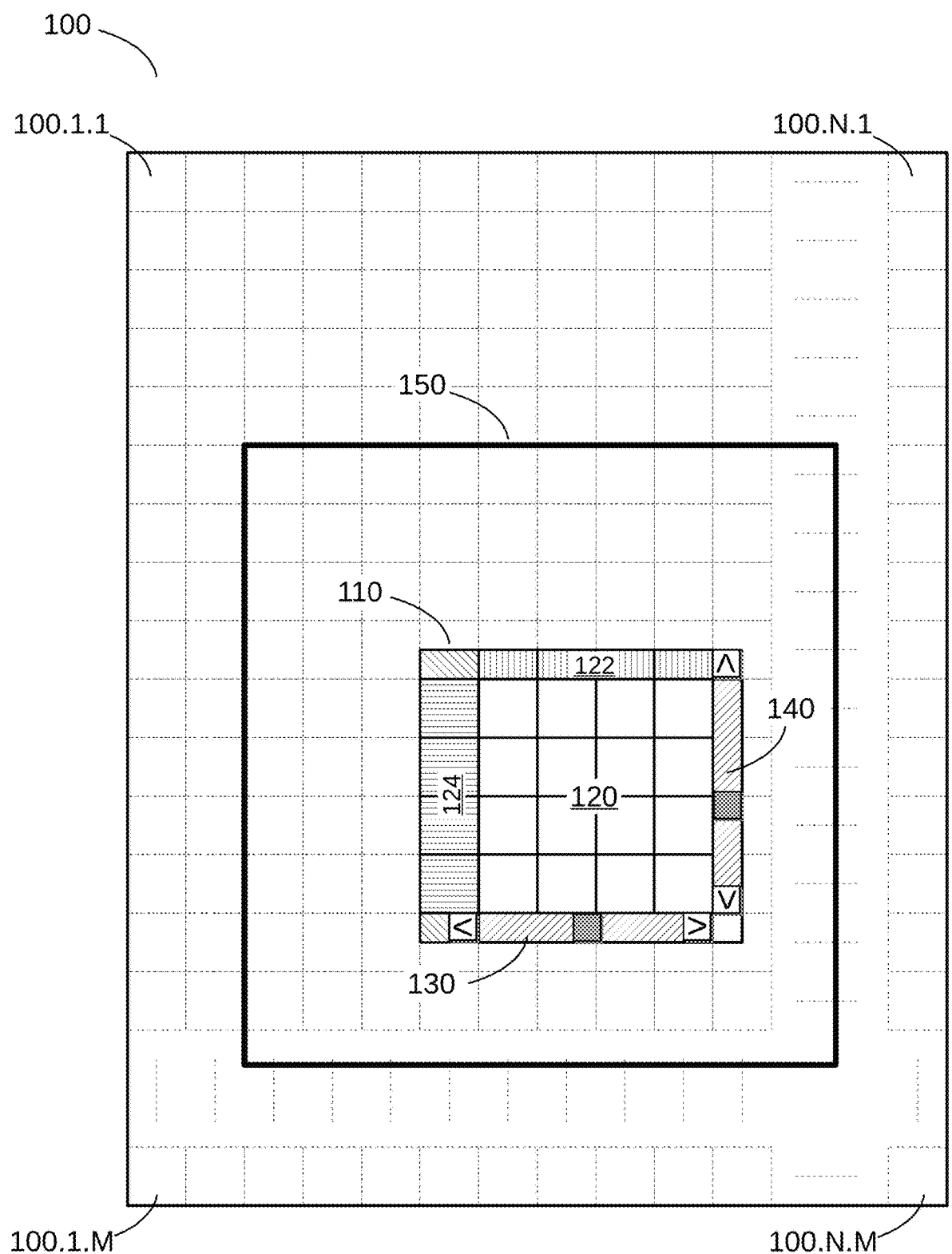
FIG. 1 illustrates an example visualization according to an embodiment of the invention.

Visualizations are software components (software components are also called controls or widgets) used in computer graphical user interfaces (GUIs) to display data, emphasizing some aspects of the data and de-emphasizing other aspects. Visualizations allow data presentation in a perspective that is meaningful for users, whether these are presenters of the data, or consumers. In the case of "big data" (extremely large or complex data sets), a user may have a need to zoom in on and interact with small portions of the data. Data may be presented in a data grid (spreadsheets, lists, tables) along row, column, page or slice, and possibly further coordinates, or in an image along x and y pixel coordinates, in a Gantt chart or other chart, in a graph, or in any other visualization format known in the art.

When creating a visualization for big data, developers may run into limitations presented by a target GUI. If the target GUI is or includes one or more commercially available HTML browsers, various browser limitations may make it difficult to present the large dataset. The visualization—often implemented in HTML and JavaScript—runs into limitations that may even be different among different available browsers. For example, the visualization may be implemented in a <div> element, for which various commercial browsers may have different height and width limitations (e.g., minimum or maximum numbers of pixels). Further, the maximum value of a supported integer may pose a limitation: a 32-bit signed integer has a maximum positive value of only 2,147,483,647, but different browsers may have other maximums. Yet further, memory available for rendering a <div> or other applicable HTML Document Object Model (DOM) element may be limited by either the browser or a client system on which the browser runs.

A dataset with data organized in a trillion rows and a trillion columns has a septillion data elements. To display one data element in a legible form, the GUI may need between one and a few hundred pixels, so displaying all data elements would require between one and a few hundred septillion pixels. Today, no browsers exist that support HTML DOM elements with a display canvas anywhere near such a size, and in any case, filling such a large canvas would be a very inefficient operation. Therefore, embodiments of the invention dynamically load and display a small subset of the data in an HTML DOM element.

Scrolling in big data poses further challenges. HTML does not provide a separate scrollbar element, but various HTML DOM elements support scrolling and come with built-in vertical and/or horizontal scrollbars. These HTML DOM elements include at least <address>, <blockquote>, <body>, <caption>, <center>, <dd>, <dir>, <div>, <dl>, <dt>, <fieldset>, <form>, <h1> to <h6>, <html>, <li>, <menu>, <object>, <ol>, <p>, <pre>, <select>, <tbody>, <textarea>, <tfoot>, <thead>, and <ul>. A user scroll input on a scrollbar in such an HTML DOM element will cause the browser to fire an "onscroll" event. JavaScript (or another script language) code in the embodiment may include an event listener that can capture the onscroll event and act on it. However, the scroll properties that the embodiment can read from the HTML DOM element relate to the contents of the HTML DOM element, rather than to the overall set of big data.

The HTML DOM element, for example a <div> element, can be made to show scrollbars. In its most common form, a scrollbar includes a track on which a slider (sometimes referred to as thumb, knob, or scroller) is placed, and on both sides of the track an arrow button. HTML DOM elements have several properties that provide scroll information, including scrollHeight, scrollTop, scrollWidth, and scrollLeft. These properties may describe the size and scroll position inside the HTML DOM element, expressed in pixels. No standard exists currently for a property describing the maximum supported values for the HTML DOM element size. Browsers may have different ways to provide this information.

FIG. 1 illustrates an example visualization 110 according to an embodiment of the invention. Big data set 100 is organized in N columns and M rows. For example, item 100.1.1 represents data in the first column and first row; item 100.N.1 represents data in the Nth column and first row; item 100.1.M represents data in the first column and Mth row; and item 100.N.M represents data in the Nth column and Mth row. Visualization 110 displays a small portion of big data set 100 in viewport 120, as well as column headers 122 and row headers 124, a horizontal scrollbar 130, and a vertical scrollbar 140. Viewport 120 has a data display position, wherein the data display position includes the location in big data set 100 of a cell in viewport 120. For example, the data display position may include the row and column coordinates in big data set 100 of the top left cell in viewport 120. Visualization 110 has a page size of 4 rows and 4 columns, meaning that in its viewport 120 there is a cell area spanning 4 rows and 4 columns.

Embodiments may implement visualization 110 in an HTML DOM element that comes with built-in scrolling capabilities. Embodiments draw the small portion of big data set 100 on a control canvas 150, whose size (in pixels) is typically much larger than the size of viewport 120. Therefore, visualization 110 and viewport 120 may show only a small portion of control canvas 150.

An HTML web page or similar document may embed visualization 110 to show the small portion of big data set 100, with headers 122 and 124, and scrollbars 130 and 140. A user interacts with an embodiment by scrolling to a location in canvas 150, and the embodiment subsequently fetches the relevant small portion of big data set 100 to convert it to display data in canvas 150 and make it visible through viewport 120. Embodiments may enable any of the following user interactions based on a scrollbar, mouse and/or keyboard:

(a) Mouse-clicking or tapping one of the scrollbar arrow buttons—this typically increases or decreases a data display position value (i.e., the viewport 120 location) with a single step size value, for example one row or one column, or with a few single steps.

(b) Mouse-clicking or tapping a scrollbar track on either side of the slider—this typically increases or decreases the data display position value with a page step size value, for example the number of rows or columns simultaneously visible to the user.

(c) Dragging a slider or scrolling the mouse wheel—embodiments change the data display position value to a new value, based on the slider's new relative position on the track, the scrollHeight or scrollWidth of the HTML DOM element, and the size of big data set 100. I.e., if the user places the vertical scrollbar slider at 75% from the top, then the data display position value will include a row at about 75% of the number of rows M. In practical cases, the resolution of the scrollbars may be much coarser than the resolution of big data set 100. The resolution of a scrollbar slider may be at least 1000 times coarser than the resolution of the big data set. Therefore, even the smallest movement of a slider may result in a large change of the data display position value. When a slider is moved to the end of a scrollbar's track, this could result in a data display position that does not include the final row or column. However, a user would expect to see the final row or column. Therefore, in such a case, embodiments may adjust the location of viewport 120 to include a page with the final row or column.

(d) Mouse-clicking or tapping one of the scrollbar arrow buttons while using one or more modifier keys (Ctrl, Alt, Shift, . . . , Ctrl+Alt, Ctrl+Shift, etc.). Embodiments may increase or decrease the data display position with a multiple of the single step size value, for example, Ctrl could modify the data display position with 10 rows or columns, Alt could modify the data display position with 100 rows or columns, Shift could modify the data display position with 1000 rows or columns. Embodiments may use any combination of modifier keys for any multiple of rows or columns.

(e) Mouse-clicking or tapping a scrollbar track on either side of the slider while using one or more modifier keys. Embodiments may increase or decrease the data display position with a multiple of the page step size value, for example, Ctrl could modify the data display position with 10 pages horizontally or vertically, Alt could modify the data display position with 100 pages horizontally or vertically, Shift could modify the data display position with 1000 pages horizontally or vertically. Embodiments may use any combination of modifier keys for any multiple of rows or columns.

(f) Typing the Home key to navigate to the first column or the End key to navigate to the last column.

(g) Typing the Page Up key to navigate to the first row or the Page Down key to navigate to the last row.

Figure 2:
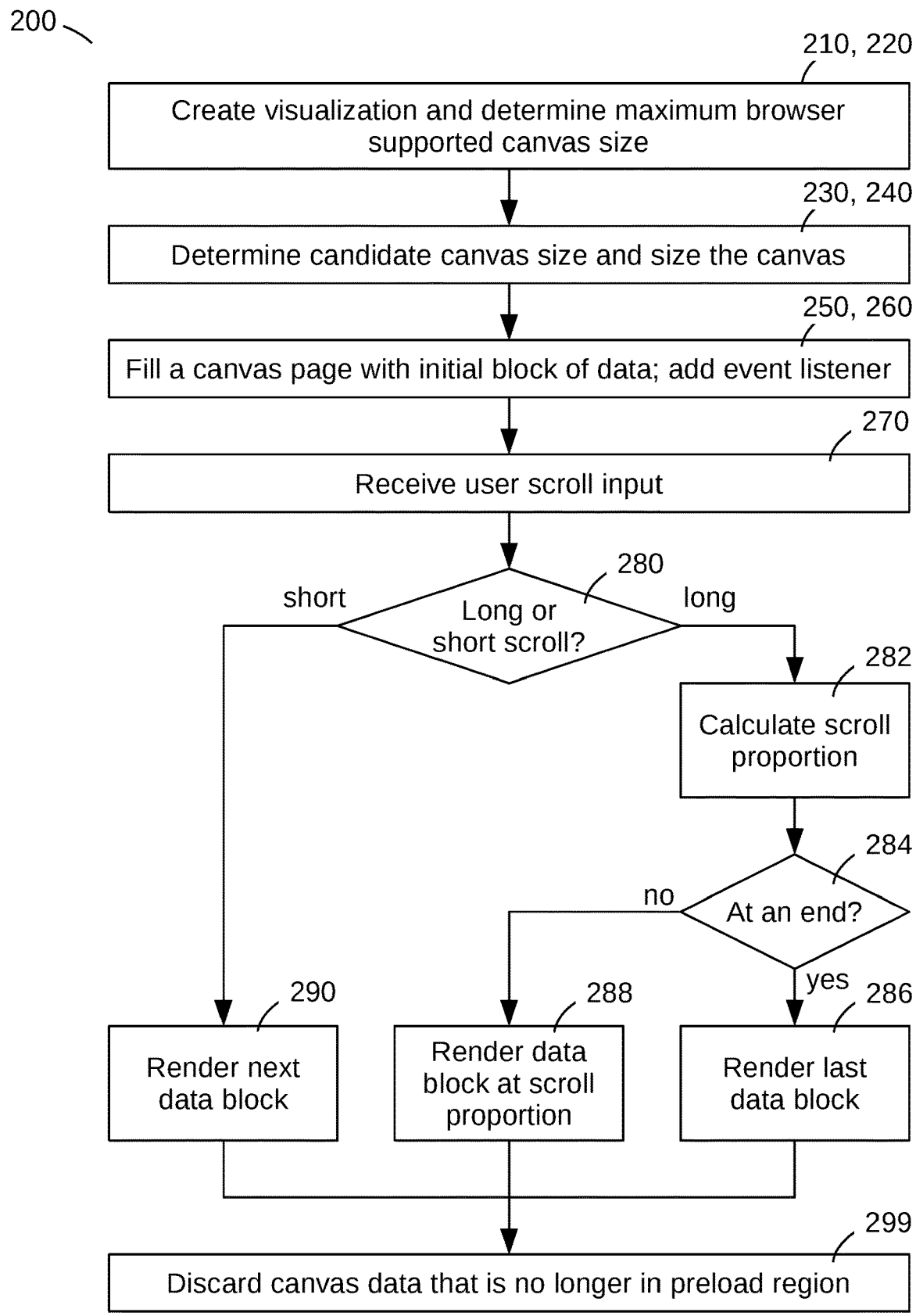
FIG. 2 illustrates an example method to display a portion of a big data set in a browser and interactively scroll in the big data set according to an embodiment of the invention.

FIG. 2 illustrates an example method 200 to display a portion of a big data set in a browser and interactively scroll in the big data set according to an embodiment of the invention. The browser may be HTML-based and is included in a GUI. The GUI is included in a computer system with a screen (or more generally, a display), and with hardware configured for receiving user inputs and forwarding the user inputs to a processor that is programmed to execute method 200. The method includes the following steps.

Step 210—create a visualization in a web page in the browser. The visualization may be or include an HTML DOM element, and includes a control canvas.

Step 220—determine a maximum browser-supported canvas size. While some browsers may be able to directly provide the maximum browser-supported canvas size information, a more general and safe way is to test the maximum. One way of testing is to create a scrollable control in the browser and performing a search for the largest supported control canvas size, successively setting the control at a series of test heights and widths, and checking if the browser returns accurate values for the test heights and widths. For example, create a control in the browser and set the control canvas at 1,000×1,000 pixels. Check if the control canvas width and height values are indeed 1,000 and 1,000. Repeat for 2,000×2,000 pixels, and so on. Once the browser returns an inaccurate value, an estimate for the maximum browser-supported canvas size is the last control canvas size for which the browser returned accurate results. Embodiments may order control canvas size test values in a linear search, a binary search, or according to any other search algorithm known in the art. Some embodiments may use a dummy control for the search. Further embodiments may perform separate searches for the maximum browser-supported width, the maximum browser-supported height, and the maximum(s) of any further dimensions. Yet further embodiments determine an estimate for the maximum size, where the accuracy of the estimate is a measure for how closely the embodiment achieves optimum performance.

Step 230—determine a candidate canvas size based on a size of the big data set. The candidate canvas size may be determined from the number of big data set rows times the average row height, and/or the number of big data set columns times an average column width. For example, if the big data set has one million columns, and the average column width is 70 pixels, then the embodiment has a candidate canvas width of 70 million pixels. If the big data set has 80 rows, and the average row height is 20 pixels, then the embodiment has a candidate canvas height of 1600 pixels. The embodiment could thus determine a candidate canvas size of 70 million pixels wide, or 1600 pixels high, or 70 million pixels wide and 1600 pixels high.

Step 240—sizing the control canvas based on the candidate canvas size and the maximum browser-supported canvas size. An example embodiment determines the smaller of the maximum browser-supported canvas size and the candidate canvas size and sets the control canvas to the smaller size. Some embodiments may do so separately for each dimension of the control canvas size. For example, if the candidate canvas width is 70 million pixels, but the maximum browser-supported canvas width is 70 thousand pixels, then the embodiment sets the control canvas width to 70 thousand pixels. Similarly, if the candidate canvas height is 1600 pixels, but the maximum browser-supported canvas height is 70 thousand pixels, then the embodiment sets the control canvas height to 1600 pixels.

Step 250—fill a preload region of at least a page in the control canvas with an initial block of data from the big data set. In the context of the control canvas, a page may be a portion of the control canvas that is equal to the viewport size in pixels, or the equivalent number of rows and columns, based on the average row height and the average column width. In the context of the big data set, a page may be a set of adjacent data spanning the (viewport) number of rows and columns. An example embodiment may determine a page size from a control viewport and may further determine the preload region in the control based on the page size, where the preload region may coincide with one or more adjacent pages. The number of pages of a data block may coincide with the number of pages in the preload region, or with one or more adjacent pages of data in the big data set. The embodiment fills at least a page in the control canvas with data rendered from and representing the initial data block.

Step 260—add scroll event listeners. In case the embodiment uses a script language such as JavaScript, the code in the script needs to include event listeners capable of receiving and acting upon user scroll inputs. For HTML and JavaScript, the event listener acts on the control's onscroll events.

Step 270—Receive a user scroll input. The user scroll input may include dragging a scrollbar slider or rotation of a mouse wheel; it may include a mouse-click or tap on a scrollbar arrow button, or track; it may include the use of one or more modifier keys (Ctrl, Alt, Shift, . . . , Ctrl+Shift, Ctrl+Alt, etc.) on a keyboard; it may include the use of direct keys on the keyboard, such as Home, End, Page Up, and Page Down; and it may include any other user scroll inputs known in the art, including touchscreen gestures.

Step 280—determine if the user scroll input results in a long or a short scroll. In an embodiment, a scroll is deemed short if, at the resulting new control canvas location, there is any rendered data. A scroll is deemed long if, at the resulting new location, no rendered data is visible. For example, suppose the control's viewport has a width of 1000 pixels and a height of 600 pixels, showing the control canvas at the control canvas top left corner, i.e. at scroll position x=0 pixels and y=0 pixels. A scroll down of 900 pixels would be a short scroll if the canvas includes rendered data in the rectangular region between x=0, y=900 and x=1000, y=1500. It would be a long scroll if the control canvas includes no rendered data in this region. Similarly, a scroll of 10,000 pixels to the right would be a short scroll if the control canvas includes rendered data in the rectangular region between x=10,000, y=0 and x=11,000, y=600. It would be a long scroll if the control canvas includes no rendered data in this region.

Step 282—upon determining that the user scroll input denotes a long scroll, calculate a scroll proportion from a scrollbar slider position. For example, if the slider location is 70% from the start of the scrollbar, then the scroll proportion is 70%.

Step 284—upon calculating the scroll proportion, determine if the scroll proportion equals 100%.

Step 286—upon determining that the scroll proportion equals 100%, fill a last page in the control canvas with a last data block from the big data set. For example, if the big data set is organized in 1 million columns and 80 rows, and the user input includes a long horizontal scroll, then the embodiment renders the last page of the 1 million columns, including the last column, in the rows that were previously visible. Embodiments may make sure not to exceed control canvas bounds by aligning the rightmost column or the bottommost row with the control canvas. Step 286 provides a user an intuitive experience by taking care that, when the user scrolls to an end, he or she will see a final row or column as may be expected, regardless of any difference in resolution between the scrollbar and the big data set.

Step 288—upon determining that the scroll proportion is less than 100%, fill a page in the control canvas with a data block that is located in the big data set at the scroll proportion. For example, if the scroll proportion is 70% horizontal and the big data set includes one million columns, then the embodiment fills a control canvas page that includes column number 700,000.

Step 290—upon determining that the user scroll input denotes a short scroll, fill a page in the control canvas with a next data block if needed to ensure that all data in the preload region has been rendered.

Step 299—update the location of the preload region and discard control canvas page data that is no longer in the preload region. Embodiments may skip step 299 if no data has been rendered in step 290. This will allow for a smoother short scroll process and less rendering of cells that are close by the preload region.

Figure 3:
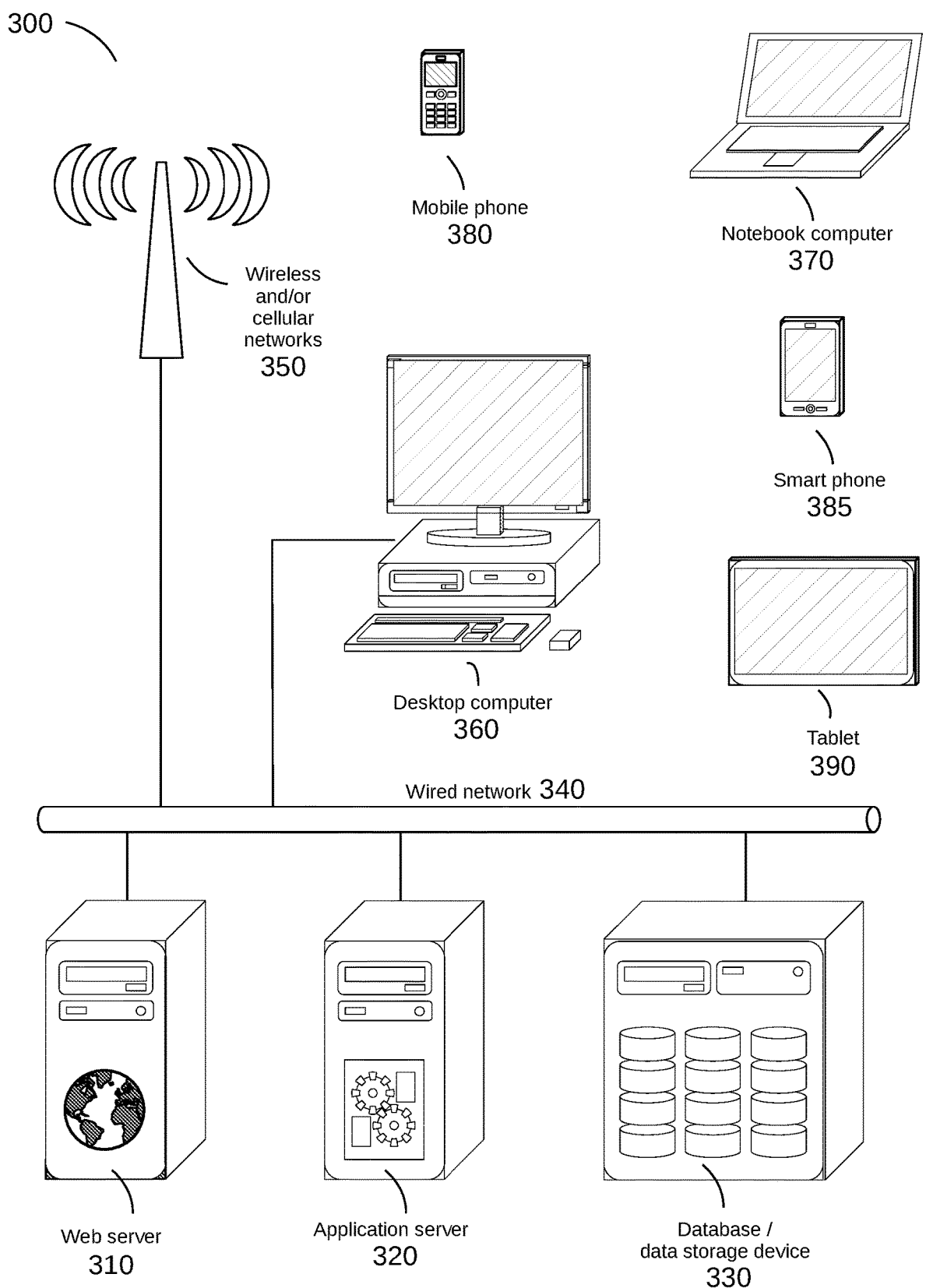
FIG. 3 illustrates a system suitable for implementing embodiments of the invention.

FIG. 3 illustrates a system suitable for implementing embodiments of the invention. FIG. 3 shows an example computer and network system architecture 300 suitable for implementing embodiments of the invention. The system includes the following user computers, which may be client computers including a GUI: desktop computer 360, notebook computer 370, mobile phone 380, smart phone 385, and tablet 390. The system can interface with any type of electronic device, such as a thin-client computer, internet-enabled mobile telephone, mobile internet access device, tablet, electronic book, or personal digital assistant, capable of displaying and navigating web pages or other types of electronic documents. Although the system is shown with five user computers, any number of user computers can be supported. User computers 360-390 and other electronic devices can act as client systems using host servers included in system 300.

A web server 310 is used to process requests from web browsers and standalone applications for web pages, electronic documents, enterprise data or other content, and other data from the user computers. Web server 310 may also provide a menu application, as well as syndicated content, such as RSS or Atom feeds, of data related to enterprise operations.

Application server 320 operates one or more mobile applications. The mobile applications can be implemented as one or more compiled or interpreted programs written in any programming language, such as Java, C, C++, C #, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 320 process input data and user computer requests and can store or retrieve data from database/data storage device 330. Database/data storage device 330 stores data created and used by the data applications. In an embodiment, the database/data storage device 330 includes a relational database, such as MySQL, that is adapted to store, update, and retrieve data in response to SQL format commands. In other embodiments, unstructured data storage architectures and NoSQL databases may also be used.

In an embodiment, application server 320 includes one or more general-purpose computers capable of executing programs or scripts. In an embodiment, web server 310 is implemented as an application running on one or more general-purpose computers. The web server and application server may be combined and executed on the same computer(s).

An electronic communication network enables communication between user computers 360-390, web server 310, application server 320, and database/data storage device 330. In an embodiment, the electronic communication network may further include any form of electrical or optical communication devices, including wired network 340 and wireless network 350. The electronic communication network may also incorporate one or more local-area networks, such as an Ethernet network; enterprise networks, wide-area networks, such as internet and cellular carrier data networks; and virtual networks, such as a virtual private network.

The system is one example for executing mobile applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. For example, embodiments shown are focused on data grids, including data cells that are arranged in rows and columns, but all concepts presented herein are equally valid for lists, tables, spreadsheets, images, charts, graphs, and other visualization formats known in the art. Similarly, embodiments shown are focused on HTML, but all concepts presented herein are equally valid for GUIs in other environments.

Any suitable programming language can be used to implement the routines of particular embodiments including ECMAScript, JavaScript, ActionScript, Silverlight, VBscript, CoffeeScript, Dart, C, C++, Java, assembly language, etc. Different programming techniques can be employed such as procedural or object oriented. Methods embodied in routines can execute on a single processor device or on a multiple processor system. Although the steps, operations, or computations may be presented in a specific order, this order may be changed in different particular embodiments. In some particular embodiments, multiple steps shown as sequential in this specification can be performed at the same time.

Particular embodiments may be implemented in a tangible, non-transitory computer-readable storage medium for use by or in connection with the instruction execution system, apparatus, board, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, application-specific integrated circuits, programmable logic devices, field-programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A "computer" may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for displaying a portion of a big data set in a browser in a graphical user interface (GUI), wherein the GUI is included in a computer system with a screen and with hardware configured for receiving user inputs, the method comprising:
    creating a visualization in a web page in the browser, wherein the visualization includes a viewport;
    determining a candidate canvas size based on a size of the big data set, wherein determining the candidate canvas size comprises at least one of calculating a number of big data set rows times an average row height or calculating a number of big data set columns times an average column width;
    determining a maximum canvas size supported by the browser;
    sizing a canvas based on the candidate canvas size and the maximum canvas size;
    filling a preload region of at least a page in the canvas with an initial block of data from the big data set, wherein the page has a size equal to a cell area to be displayed in the viewport;
    displaying the visualization on the computer screen, and displaying a scrollbar in the visualization;
    receiving a user scroll input, wherein the user scroll input may denote a long scroll or a short scroll;
    determining if the user scroll input denotes either a long scroll or a short scroll;
    upon determining that the user scroll input denotes a long scroll, calculating a scroll proportion from a scrollbar slider position;
    upon calculating the scroll proportion, determining if the scroll proportion equals 100%;
    upon determining that the scroll proportion equals 100%, filling a last page in the canvas with a last block of data from the big data set;
    upon determining that the scroll proportion is less than 100%, filling a page in the canvas with a data block from a big data set location calculated from a size of the big data set times the scroll proportion; and
    upon determining that the user scroll input denotes a short scroll, filling a page in the canvas with a next block of data from the big data set.

2. The method of claim 1, wherein determining the maximum canvas size comprises a search successively setting a control in the browser at a series of test heights and widths, and checking if the browser returns accurate values for the test heights and widths.

3. The method of claim 1, wherein sizing the canvas comprises determining the smaller of the maximum canvas size and the candidate canvas size.

4. The method of claim 1, wherein the initial block of data coincides with one page or two or more adjacent pages of data in the big data set.

5. The method of claim 1, further comprising adding scroll event listeners capable of receiving and acting upon user scroll inputs.

6. The method of claim 1, wherein the user scroll input denotes a short scroll if at a resulting new canvas location there is any rendered data, and denotes a long scroll if at the resulting new canvas location there is no rendered data.

7. The method of claim 1, wherein a scrollbar slider resolution is at least 1000 times coarser than a resolution of the big data set.

8. The method of claim 1, further comprising discarding canvas page data that is no longer in the preload region of the canvas.

9. The method of claim 1, wherein the browser supports hypertext markup language (HTML).

10. The method of claim 9, wherein the control includes an HTML document object model (HTML DOM) element.

11. A tangible, non-transitory computer-readable information storage medium including instructions adapted to direct a computer to display a visualization in a graphical user interface (GUI) in a browser on a computer screen, comprising:

creating a visualization in a web page in the browser, wherein the visualization includes a viewport;

determining a candidate canvas size based on a size of a big data set, wherein determining the candidate canvas size comprises at least one of calculating a number of big data set rows times an average row height or calculating a number of big data set columns times an average column width;

determining a maximum canvas size supported by the browser;

sizing a canvas based on the candidate canvas size and the maximum canvas size;

filling a preload region of at least a page in the canvas with an initial block of data from the big data set, wherein the page has a size equal to a cell area to be displayed in the viewport;

displaying the visualization on the computer screen, and displaying a scrollbar in the visualization;

receiving a user scroll input, wherein the user scroll input may denote a long scroll or a short scroll;

determining if the user scroll input denotes either a long scroll or a short scroll;

upon determining that the user scroll input denotes a long scroll, calculating a scroll proportion from a scrollbar slider position;

upon calculating the scroll proportion, determining if the scroll proportion equals 100%;

upon determining that the scroll proportion equals 100%, filling a last page in the canvas with a last block of data from the big data set;

upon determining that the scroll proportion is less than 100%, filling a page in the canvas with a data block from a big data set location calculated from a size of the big data set times the scroll proportion; and upon determining that the user scroll input denotes a short scroll, filling a page in the canvas with a next block of data from the big data set.

12. A system comprising:

a client computer including a graphical user interface (GUI) in a browser;

a database storing a big data set; and an application server connected with the database and the client computer via at least one network, wherein the application server is adapted to retrieve data from the database and communicate the retrieved data to the client computer;

wherein the client computer includes a software program including instructions executable by the client computer to perform a method, the method comprising:

creating a visualization in a web page in the browser, wherein the visualization includes a viewport;

determining a candidate canvas size based on a size of the big data set, wherein determining the candidate canvas size comprises at least one of calculating a number of big data set rows times an average row height or calculating a number of big data set columns times an average column width;

determining a maximum canvas size supported by the browser;

sizing a canvas based on the candidate canvas size and the maximum canvas size;

filling a preload region of at least a page in the canvas with an initial block of data from the big data set, wherein the page has a size equal to a cell area to be displayed in the viewport;

displaying the visualization on a client computer screen, and displaying a scrollbar in the visualization;

receiving a user scroll input, wherein the user scroll input may denote a long scroll or a short scroll;

determining if the user scroll input denotes either a long scroll or a short scroll;

upon determining that the user scroll input denotes a long scroll, calculating a scroll proportion from a scrollbar slider position;

upon calculating the scroll proportion, determining if the scroll proportion equals 100%;

upon determining that the scroll proportion equals 100%, filling a last page in the canvas with a last block of data from the big data set;

upon determining that the scroll proportion is less than 100%, filling a page in the canvas with a data block from a big data set location calculated from a size of the big data set times the scroll proportion; and upon determining that the user scroll input denotes a short scroll, filling a page in the canvas with a next block of data from the big data set.

* * * * *